United States Patent Office 3,366,489
Patented Jan. 30, 1968

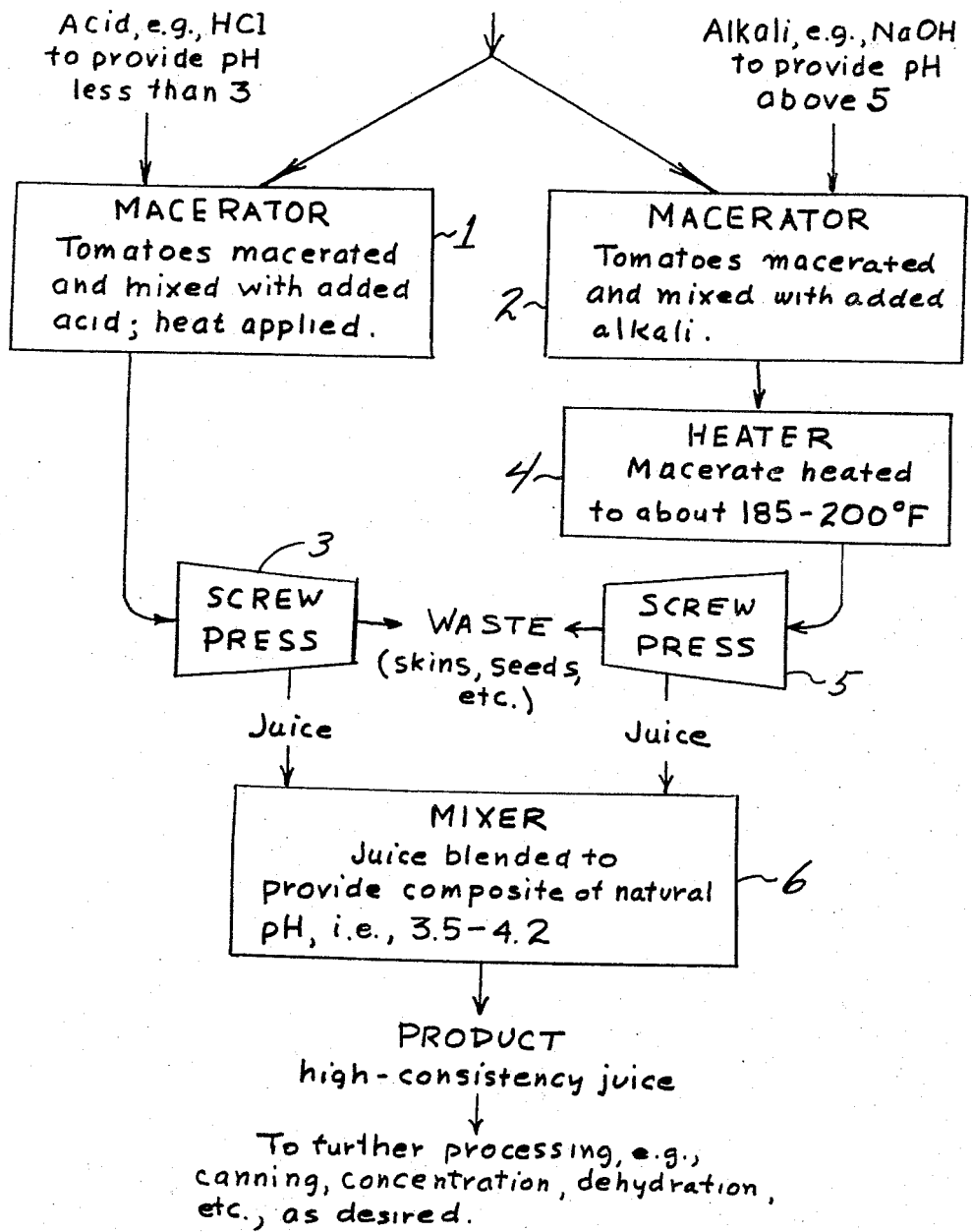

3,366,489
METHODS FOR PREPARING HIGH-CONSISTENCY TOMATO JUICE
Joseph R. Wagner, Moraga, and Jackson C. Miers, Pleasant Hill, Calif., assignors to the United States of America as represented by the Secretary of Agriculture
Continuation-in-part of application Ser. No. 479,351, Aug. 12, 1965. This application Feb. 21, 1967, Ser. No. 617,563
12 Claims. (Cl. 99—105)

ABSTRACT OF THE DISCLOSURE

Tomato juice of increased (thicker) consistency is produced by macerating tomatoes in the presence of added alkali (e.g., NaOH) or acid (e.g., HCl), heating, restoring natural pH of tomato material, and separating juice from the macerate. In a preferred system, the tomatoes are split into two batches. One batch is macerated with added alkali, the other with added acid. Mixing of the resulting macerates forms a composite of natural pH which by conventional mechanical treatment yields a juice of high consistency.

---

This application is a continuation-in-part of our copending application, Ser. No. 479,351, filed Aug. 12, 1965, now abandoned.

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing tomato juice of high consistency. Further objects of the invention will be evident from the following description wherein parts and percentages are by weight unless otherwise specified.

The annexed drawing is a flow sheet illustrating application of the process of the invention.

It is recognized in the industry that consistency is an important attribute of tomato juice. In particular, higher consistency represents better quality. It is to be especially noted that consistency has no fixed relationship with solids content so that whereas two lots of tomato juice prepared by different procedures and/or different raw materials may have identical solids content, their consistencies may be radically different. The matter of consistency is not only important with regard to tomato juice per se but also with regard to products prepared therefrom, such as concentrated juice, pastes, sauces, ketchups, etc. In all these products a higher consistency signifies better quality and to attain such quality it is necessary that the juice employed as the starting material be of high consistency.

Those familiar with the art are aware that consistency of tomato juice may be controlled to some extent by the method of manufacturing the juice, particularly by choice of the cold-break method or the hot-break method. In the cold-break method, raw tomatoes are macerated at ambient temperatures and the resulting pulp is pressed through perforated sheet metal or wire mesh screens to separate the juice from the seeds, skins, cores, etc. This process yields a juice of relatively low consistency due, it is believed, to degradation of pectin-containing colloids by enzymes such as pectinesterase and polygalacturonase which naturally occur in the fruit. In the hot-break method, the same mechanical steps are used but in addition heat is applied, i.e., the tomatoes—during maceration or immediately after they are broken up—are quickly heated to a temperature of 185° F. or higher so as to inactivate the enzymes responsible for the loss of consistency. The juice obtained in this technique has a higher consistency than that produced by the cold-break system and thus the hot-break procedure is generally preferred in industry.

Application of the techniques of the present invention provides advantages over those attainable with the known processes. As an example, the process of the invention may be applied in conjunction with the known hot-break method whereby to yield a juice of substantially higher consistency than obtained with the usual hot-break system. Moreover, although the procedure of the invention is preferably applied in conjunction with hot-break systems, it can also be advantageously applied in cold-break systems. In such case, the juice product will have a higher consistency than obtained with the standard cold-break system though it is not claimed that the consistency will be as high as where the invention is applied in conjunction with heat. One advantage of utilizing the invention in conjunction with the cold-break method is that it can be practiced in a plant having equipment designed for operation at ambient temperatures and the modification will permit production of juice of consistently high consistency.

In the copending application of J. R. Wagner, J. C. Miers, and H. K. Burr, Ser. No. 626,364, filed Nov. 4, 1966, a continuation-in-part of Ser. No. 439,488, filed Mar. 12, 1965, there is disclosed a process wherein high consistency juices are prepared by macerating tomatoes in the presence of added acid, e.g., HCl.

It has now been found that an increase in pH is also effective to obtain juices of increased consistency. Thus, in accordance with the preferred embodiment of the present invention, the basic step involves macerating raw tomatoes in the presence of added alkali. The verb "macerate" is employed herein—in common with its usage in the art—to denote application of mechanical action to break up or subdivide the tomatoes into a pulpy mass.

Generally, sodium hydroxide is preferred for use as the added alkali because it is effective, relatively inexpensive, and particularly because eventual neutralization of the product (with hydrochloric acid) yields sodium chloride—a common additive in tomato products. However, other non-toxic alkalis can be employed as the primary consideration is an increase in pH. Thus, one may employ such alkalis as potassium hydroxide, sodium or potassium carbonate, or the like. It is, of course, within the scope of the invention to use mixtures of two or more alkalis, for example, a mixture of sodium and potassium hydroxides.

In general, it has been observed that addition of enough alkali to establish a pH in the macerate of about 5 will provide a substantial increase in consistency over that attained in the absence of added alkali. Usually, it is preferred to use sufficient alkali to provide a pH of about from 5.5 to 8.5, whereby to yield a large increase in consistency. Generally, as the pH is increased above 8.5 the degree of consistency improvement tends to taper off. For this reason, pH's above 8.5, particularly above 9, are preferably avoided. In conducting particular runs, the pH may be varied within the above ranges depending on such factors as the consistency desired and the nature of the tomatoes being processed—i.e., the consistency they would yield in absence of added alkali.

As noted above, the benefits of the invention are attained in accordance with the preferred embodiment thereof by macerating raw tomatoes in the presence of added alkali. In the maceration step the fruit is broken up and mixed with the alkali so that there is intimate contact between the alkali and the tomato material, including both liquid and cellular particles. Included in the tomato material are enzymes and enzyme substances, and it is believed that the desired result of high consistency is attained by a control of enzymic action. In particular, it is believed that the added alkali inhibits the action of polygalacturonase or other enzymes which normally degrade pectin and similar colloidal materials. Retention of this colloidal material is, of course, required for a high-consistency product. It is also believed that the added alkali enhances the action of pectinesterase on pectin constituents in the system, giving rise to partially or even completely demethoxylated derivatives which impart a higher consistency than pectin, itself. Although the above mechanism is advanced, the important point from a practical and realistic view is that maceration with added alkali does yield a high-consistency juice and the theoretical nature of the reactions are of no real concern to the invention.

In a practice of the preferred embodiment of the invention, it is desirable that the alkali be present at the time the tomato structure is broken up, and for this reason it is preferred to add the alkali to the tomatoes while they are still whole or, at most, after they have been cut into pieces. When this is done, the alkali contacts the particles of tomato material as these particles are formed by the comminution of the fruit. As a result, the enzymes and enzyme substrates released by the disorganization of natural structure have little or no opportunity to react in the manner in which they would at the natural pH. On the other hand, were the tomatoes to be broken up as such and then mixed with alkali, substantial loss of consistency would occure because of the interaction of released enzymes and enzyme substrates before the pH alternation could effect the desired enzymic regulation.

The effect of the alkali is rapidly realized so that the maceration in contact with alkali need only be conducted for a short period of time, e.g., about from 10 seconds to 15 minutes. This step is usually conducted at ambient temperatures and then heat is applied to inactivate the enzymes in the system. Usually, the material is heated to a temperature of at least 185° F., preferably about 200° F. If desired, the heating step may be concomitantly applied as the tomatoes and added alkali are subjected to maceration. In such case the rate of heating should be sufficiently slow to permit the desired enzyme action, leading to increased consistency, to take place before the temperature rises so high as to inactivate the enzymes.

After the tomatoes have been broken down to a pulp and intimately mixed with the alkali, and preferably after heating has been applied, the pulp is passed through conventional equipment to separate the juice from the skins, seeds, cores, etc. A noteworthy advantage of the invention is that the desired result is attained by the addition of a single chemical—a simple alkali—and no other substances are required.

It is obvious that addition of the alkali will produce a juice having a flat taste. Accordingly, the product is neutralized to its normal pH (usually in the range 3.8–4.2) by incorporation of hydrochloric acid. Other nontoxic acids may, of course, be used, for example, sulphuric, phosphoric, citric, tartaric, malic, etc. In the event that a cold-break system is used, the juice (or macerate) is heated to an enzyme-inactivating temperature (about 185–200° F.) at some stage in the processing. Generally, such heating is preferably applied prior to neutralization in order to prevent further enzyme action detrimental to the high consistency, and in order to form a product of smooth texture, i.e., free from lumps or grainy material. Although the juice is generally neutralized to its normal pH, in some cases it may be preferred to establish a different final pH. For example, for preparation of ketchup a more acid product is desirable and in such case the juice may be acidified to a pH in the range 3.0 to 3.7. In the preparation of soup, sauces for meats, etc., a more alkaline product is desired and in such case the acidification may be omitted or applied to a small extent to establish a pH in the range 4.3 to 7.

A particular advantage of the invention is that it can be applied to conventional juice-production lines with but minor changes. Thus, standard juice production involves a maceration of the fruit at an early stage in the line and the alkali can be introduced into the macerating device with conventional metering equipment. For the neutralization one need only provide a mixer and a device for introducing acid at the appropriate rate whereby the macerate (or the juice) is brought to its original pH. It may be noted that such changes in the standard production pattern do not contribute any interference with flow of the tomato material through the system. Thus, addition of the alkali does not interfere with or prolong the maceration step and the neutralization step likewise does not cause any delay in transferring the pulp (from the macerator) to the juice-extracting step.

In a particularly preferred embodiment of the invention, the alkali treatment is utilized in conjunction with the acid treatment of the above-mentioned prior application, Ser. No. 626,364. In essence, this embodiment involves the following procedure. A lot of raw tomatoes is divided into two batches. One batch of tomatoes is macerated with added alkali as hereinabove described; the other batch of tomatoes is macerated with added acid as described in Ser. No. 626,364. Preferably, heating—to about 185° to 200° F.—is also applied in each case. The macerates are then passed through a screw press or other conventional device to extract the juice and remove the skins, seeds, etc. The respective juices are then blended together in such proportion that the composite has the natural tomato pH, usually in the range 3.8–4.2. A primary advantage of this combined treatment is that it yields a juice of high consistency. Another advantage is that both the alkali and the acid are employed for their consistency-increasing effect. This is a more efficient system than, for example, where the maceration is with added acid and then alkali is added merely to restore pH. In such case, the alkali functions only as a neutralizing agent. In the combined process, both acid and alkali function as neutralizing agents and as consistency-increasing agents. A further advantage of the combined process is that less reagents—acid and alkali—are required to obtain a given increase in consistency. Also, the combined process is very versatile to achieve any desired consistency increase. Thus, by such manipulations as varying the proportions of tomato in each batch, by varying the amounts of acid and alkali used, etc., one can regulate the process to attain a small increase in consistency, a large increase in consistency, or even such a drastic increase in consistency that the composite is a gel, as may be desired for aspic-type products.

A typical method of practicing the combined acid-alkali treatment is described below in conjunction with the annexed drawing.

Referring to the flow sheet, raw tomatoes are continuously fed at predetermined rates into macerators 1 and 2. Concomitantly, acid is metered into macerator 1 at a rate to provide a pH less than 3; alkali is metered into macerator 2 at a rate to provide a pH above 5. In macerator 1, the tomatoes are comminuted and mixed with the added acid and concomitantly heated to about 200° F. In macerator 2, the same action takes place except it is carried out at ambient temperatures. The macerate produced in macerator 1 flows to screw press 3 to separate the skins, seeds, etc. The macerate produced in macerator 2 flows through heater 4 where it is brought to about 200° F. and the hot macerate passes to screw press 5 for removal of skins, seeds, etc. The juices issuing from presses 3 and 5 flow to mixer 6 where they are blended to produce a juice of natural pH level. Mixer 6 may be provided with metering apparatus responsive to pH to ensure that the composite juice has the desired pH. Maintenance of uniform pH may be effected by adjusting the relative input of juices from presses 3 and 5, or by adding small quantities of NaOH or HCl solution. The resulting high-consistency product issuing from mixer 6 may then be processed in known manner to produce canned juice, concentrated or dehydrated products, etc.

Tomato juice prepared in accordance with the invention may be processed in conventional manner. For example, it may be canned as a single-strength juice or it may be first concentrated to a paste or puree and canned in such state. It may be used in single-strength or concentrated form, in the preparation of soups, sauces, ketchups, preserves, aspic products, etc. Also, it may be converted into solid dehydrated products by such known techniques as concentration followed by foam-mat or vacuum dehydration or by spray drying. It is an important feature of the invention that the color, flavor, and nutrient value of the juice are not impaired so that it is suitable for all the uses for which conventional tomato juice is adapted.

Since the process of the invention produces a high-consistency juice, this product can be blended with conventional juices (ones of lower consistency) to provide a composite juice of intermediate consistency as may be required for a particular application. As an example of such procedure, a juice processing line may be operated for a first period of time in conventional manner and operated for a second period of time with application of the process of the invention, the two juices being then combined to yield the final product. By varying the relative duration of the first and second periods, products of a wide range of consistency can be produced.

As explained hereinabove, the acid treatment of Ser. No. 626,364 may be used in conjunction with the alkali treatment. Although the acid treatment is fully described in the aforesaid prior application, the procedure will be summarized hereinbelow in paragraphs 1 and 2 to provide an independent disclosure:

(1) The basic step of the acid treatment is macerating raw tomatoes in the presence of added acid. Generally, hydrochloric acid is preferred but other non-toxic acids which are more strongly ionized than acetic (i.e., have an ionization constant greater than $1.86 \times 10^{-5}$) can be used. Typical examples of such acids are sulphuric, ortho-phosphoric, metaphosphoric, pyrophosphoric, tartaric, and citric. The acid is added in an amount sufficient to provide a macerate of pH less than 3.5. Usually it is preferred to operate at a pH range of about 2.5 to about 3.0 —particularly in a system where maceration is conducted hot—whereby a large increase in consistency is achieved without requiring excessive amounts of added acid. It has been observed that as the pH is reduced below about 2, little if any additional increase in consistency is attained. Thus, whereas the pH may be decreased to very low levels, there is no practical reason gained by going below a pH of 1. In conducting particular runs, the pH may be varied within the above ranges depending on such factors as the consistency desired and the nature of the tomatoes being processed—i.e., the consistency they would yield in the absence of added acid.

(2) As noted above, the benefits of the acid treatment are realized by macerating the raw tomatoes in the presence of added acid. The primary aim of this maceration step is to break up the fruit and mix it with the acid so that there is intimate contact between the acid and the tomato material, including both liquid and cellular particles. In order to achieve the desired result of a high-consistency juice, it is necessary that the acid be present at the time the tomato structure is broken up, and for this reason it is preferred to add the acid to the tomatoes while they are still whole or at most after they have been cut into pieces. When this is done, the acid is mixed with the particles of tomato material as these particles are formed by the comminution of the fruit. As a result, the enzymes and enzyme substrates released by the disorganization of natural structure have no opportunity to react. On the other hand, were the tomatoes to be broken up as such and then mixed with acid, substantial loss of consistency would occur because of the interaction of released enxymes and enzyme substrates before the acid could do its work. The effect of the acid is rapidly realized so that the maceration need only be conducted for a short period of time, e.g., about from 10 seconds to 5 minutes, depending mainly on the efficacy of the equipment used to effectuate the maceration. For production of juice of maximum consistency the macerate is heated to a temperature of at least 185° F., preferably about 200° F. The heating may be applied after completion of maceration but, preferably, heat is concomitantly applied as the tomatoes and added acid are subjected to maceration.

Another plan for utilizing the present invention involves applying the herein-described alkali treatment in conjunction with the acid treatment described in the co-pending application of J. R. Wagner, J. C. Miers, and H. K. Burr, Ser. No. 600,659, filed Dec. 9, 1966. This application describes procedures which basically involve mixing tomato material (which previously has been subjected to heating to inactivate enzymes) with added acid in an amount sufficient to provide a pH of less than 3.5, and then extracting the juice from the resulting mixture, the juice so obtained being higher in consistency than would be obtained without addition of the acid. A typical system for applying the present invention in conjunction with that of Ser. No. 600,659 involves the following:

(I) A lot of tomatoes is divided into two batches.

(II) One batch of tomatoes is macerated and heated, for example, to 200° F., to inactivate enzymes. A non-toxic acid is added to the macerate in an amount required to establish a pH less than 3.5. (Hydrochloric acid is usually used but other acids stronger than acetic, as above exemplified, can also be used.) After mixing in the acid, the macerate is passed through a screw press or other conventional device to separate the juice from the skins, seeds, etc.

(III) The other batch of tomatoes is macerated with added alkali to produce a macerate of pH above 5. This macerate is then heated to about 200° F. and then put through a screw press or other conventional device to separate the juice from the skins, seeds, etc.

(IV) The juices from steps II and III are then blended to produce a juice product which is not only of increased consistency but of natural pH.

It is evident from the above that the combination procedure results in utilizing the added acid and the added alkali for both (a) there consistency-increasing action and (b) for their neutralizing action.

A further modification of the invention is concerned with a procedure for increasing the consistency of previously-prepared tomato juices. The starting material for this procedure is a tomato juice, preferably of high pectin content, prepared by standard techniques, for example, conventional heat-break technique or by the acid-treatment processes of either of the aforesaid applications, Ser. No. 600,659 or Ser. No. 626,364. To such a juice an alkali is added to increase the pH to above 5. Preferably, enough alkali is added to give a pH of about 6 or 7. Any of the alkalis as hereinabove described may be employed. Into this mixture is stirred a minor proportion—for example, about 5 to 25%—of unheated (i.e., raw) tomato juice. The mixture is held for a short period, heated to inactivate enzymes, and then restored to the natural pH of the tomato material by addition of a non-toxic acid. The product will be found to be of high consistency, and in most cases to form a gel particularly useful in aspic products. A typical illustration of this procedure is set forth below in Example IV.

The invention is further demonstrated by the following illustrative examples.

The macerating and blending operation referred to in the examples were carried out in a large "Waring Blendor" equipped with a one-gallon bowl and a rotating blade assembly in the base of the bowl to cut and blend the material contained therein. Where the material was to be concomitantly heated, a steam-heated coil was inserted in the bowl in contact with the material undergoing treatment.

After maceration and blending, with or without application of heat, the juice was extracted from the macerate by passing the latter through a tapered screw-type extractor provided with a perforated metal screen (0.033 inch perforations).

Consistency of the juice products was determined at 25° C. (77° F.) by measuring the time required for 96 ml. of the liquid to pass through the 3.3 mm. (I.D.) orifice of a 100-ml. pipette.

In various of the examples, runs not representative of the process of the invention are included for purposes of comparison.

Example I

Raw tomatoes were quartered and divided into four comparable 1-kg. lots. Each lot was then treated as follows:

Lot 1: Macerated and blended, initially for 10 seconds at room temperature, then with a steam coil in the system for an additional 2.5 minutes to bring the macerate to 200° F. Since no alkali was added this lot served as a blank.

With the other lots, varying amounts of alkali were added to the tomatoes before initiating the same maceration, blending, and heating as applied to Lot 1. The amounts of alkali added were:

| Lot: | 3 N NaOH (ml.) |
| --- | --- |
| 2 | 16 |
| 3 | 24 |
| 4 | 32 |

Immediately following the above treatments, each lot was passed through the extractor. The juice from each lot was brought to 25° C. (77° F.) and tested for consistency and pH. The results are given below:

| Lot | Additive (ml. of 3 N NaOH added per kg. of tomatoes) | pH of juice | Consistency of juice, seconds |
| --- | --- | --- | --- |
| 1 | None used | 4.15 | 21 |
| 2 | 16 | 5.32 | 79 |
| 3 | 24 | 6.62 | 100 |
| 4 | 32 | 8.68 | 67 |

Portions of each juice of Lots 2, 3, and 4 were reacidified with concentrated hydrochloric acid to restore the natural pH. The resulting products were tested for consistency. The results are given below:

| Lot | Additive (ml. of 3 N NaOH added per kg. of tomatoes) | pH (after reacidification with HCl) | Consistency* |
| --- | --- | --- | --- |
| 2 | 16 | 4.29 | Gelled, grainy. |
| 3 | 24 | 4.12 | Gelled, smooth texture. |
| 4 | 32 | 3.88 | Gelled, soft, grainy. |

* The consistency of the products was too high to measure by the pipette technique.

Example II

A batch of raw tomatoes was quartered and divided into a series of 1-kg. lots. Each of these lots was then treated as follows:

Lot 1 (blank): Macerated and blended, initially for 10 seconds at room temperature, then with a steam coil in the system for an additional 2.5 minutes to bring the macerated to 200° F.

Lot 2: Same as Lot 1 except 12 ml. of 12 N HCl was added to the tomatoes before initiating the maceration.

Lots 3, 4, 5: Same as Lot 1 except that 16, 20, and 24 ml., respectively, of 3 N NaOH solution was added to the tomatoes prior to starting the maceration.

Following these treatments, each lot of hot macerate was separately passed through the extractor. The resulting juices were collected for evaluation. The results are tabulated below:

| Lot | Additive | pH of juice | Consistency of juice, seconds |
| --- | --- | --- | --- |
| 1 | None | 4.09 | 27 |
| 2 | HCl | 1.43 | 213 |
| 3 | NaOH | 5.52 | 98 |
| 4 | NaOH | 5.63 | 88 |
| 5 | NaOH | 6.19 | 109 |

Juice #2 (derived from the acid treatment) was then formed into blends with the juices prepared by the alkali treatment. In each case, the proportions of juices were designed to yield a composite juice having a pH approximately the same as that of the control (Lot #1, pH 4.09). The results are tabulated below:

| Blend | Composition | pH | Consistency |
| --- | --- | --- | --- |
| A | 1 part #2, 3 parts #3 | 4.09 | Gelled. |
| B | 5 parts #2, 12 parts #4 | 4.28 | Do. |
| C | 3 parts #2, 5 parts #5 | 3.73 | Fluid, but too thick for consistency determination. |

Example III

Ripe tomatoes were quartered and the quarters allocated to a series of lots of 1 kg. each. Each lot was macerated and blended with or without an additive (as indicated below), heated to 200° F., and the juice expressed in the tapered screw extractor. After cooling, consistency and pH were determined for the various samples. The results are tabulated below:

| Lot | Additive | pH | Consistency, sec. |
| --- | --- | --- | --- |
| 1 | None | 4.09 | 33 |
| 2 | HCl [1] | 1.28 | 305 |
| 3 | NaOH [2] | 7.83 | 204 |

[1] 12 ml. conc. HCl per kg. of tomators
[2] 24 ml. of 3 N NaOH per kg. of tomatoes One part of juice #2 (derived from the acid treatment) was blended hot with 2 parts of juice #3 (derived from the alkali treatment) to form a product which had a pH of 4.09 and which formed a strong gel on cooling. This product, designated A, was then used to form products of intermediate consistency by blending hot with the control (low-consistency juice #1. The proportions employed and the consistency of the products are given below:

| Product: | Consistency, sec. |
| --- | --- |
| A, alone | Strong gel. |
| 1 part #1, 3 parts A | Firm gel. |
| 1 part #1, 1 part A | Weak gel. |
| 3 parts #1, 1 part A | 60. |
| #1, alone | 33. |

Example IV

Raw tomatoes were macerated with added hydrochloric acid (to pH 1.3), applying concomitant heating to inactivate enzymes. The hot macerate was put through a pulper to extract the juice.

Three hundred grams of the above juice was adjusted to pH 6.9 with NaOH. The juice was then divided into two batches. One batch was mixed with 10% by volume of juice which had been prepared without heat or additives, i.e., raw juice, from the same lot of tomatoes. The treated batch and the other (untreated control) were allowed to stand ½ hour at ambient temperature. Both samples were then heated to 190° F., acidified with HCl to the natural pH (3.8-3.9), and poured into separate vessels. It was observed that the treated sample gelled very rapidly on cooling; the control remained liquid. Both samples were held in a refrigerator overnight and re-examined. The treated sample was a firm gel (Bloom gelometer measurement of the gel was 84 grams); the control batch was still in liquid form.

Having thus described the invention, what is claimed is:

1. A process for preparing tomato juice of increased consistency which comprises macerating tomatoes in the presence of added non-toxic alkali in an amount to provide a pH above 5 and extracting the juice from the resulting macerate.

2. The process of claim 1 wherein the alkali is sodium hydroxide.

3. The process of claim 1 wherein the alkali is sodium hydroxide in an amount to provide a pH of about from 5.5 to 8.5.

4. The process of claim 1 wherein heat is applied after the maceration to bring the macerate to a temperature of at least 185° F.

5. The process of claim 1 wherein the juice is heated to a temperature of at least 185° F.

6. The process of claim 1 wherein the macerate is neutralized to its natural pH by addition of non-toxic acidic material, prior to extraction of the juice therefrom.

7. The process of claim 1 wherein the juice is neutralized to its natural pH by addition of non-toxic acidic material.

8. The process of claim 1 wherein the juice is blended with a different juice of lesser consistency to provide a composite juice of desired intermediate consistency.

9. A method for preparing high-consistency tomato juice which comprises applying sodium hydroxide, in an amount to provide a pH of about 5.5 to 8.5, to raw tomatoes in a condition in which the tissue is largely in its natural organized state, applying maceration to the mixture of tomatoes and added alkali, continuing the maceration until there is produced a uniform intimate blend of comminuted tomato material and alkali, heating the resulting macerate to an enzyme-inactivating temperature, extracting the juice therefrom, and neutralizing the juice to a pH of about 3.8-4.2.

10. A method for preparing high-consistency tomato juice which comprises dividing a lot of raw tomatoes into raw batches, macerating one batch in the presence of added non-toxic acid in an amount to provide a pH less than 3.5, macerating the other batch in the presence of added alkali in an amount to provide a pH above 5, and combining the resulting macerates.

11. A method for preparing high-consistency tomato juice which comprises dividing a lot of raw tomatoes into two batches, macerating one batch in the presence of added non-toxic acid in an amount to provide a pH less than 3.5, macerating the other batch in the presence of added alkali in an amount to provide a pH above 5, extracting the juice from the respective macerates, and combining the resulting juices.

12. A method for increasing the consistency of previously-prepared tomato juice which comprises:
  (a) adding to the tomato juice a non-toxic alkali in an amount to provide a pH of above 5,
  (b) incorporating into the resulting mixture about 5 to 25% of raw tomato juice,
  (c) holding the resulting material until its consistency increases, and then
  (d) heating the product to inactivate enzymes, and
  (e) acidifying it to restore the natural pH of the tomato material.

References Cited
UNITED STATES PATENTS

| | | | |
|---|---|---|---|
| 2,928,744 | 3/1960 | Ponting | 99—105 |
| 2,291,704 | 8/1942 | Fisher | 99—154 |

OTHER REFERENCES

Tressler et al. Fruit and Vegetable Juices, Aui Pub. Co., 1939, pp. 300–313.

Food Technology "Effect of Tomato Cell Structure on Consistency of Tomato Juice," vol. 11, pp. 19–22, 1957.

A. LOUIS MONACELL, *Primary Examiner.*

M. VOET, *Assistant Examiner.*